Figure 1:
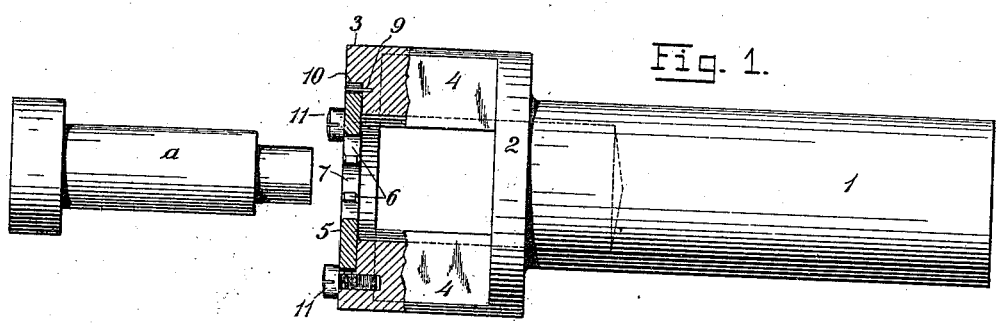

E. TRAUB.
FINISHING TOOL.
APPLICATION FILED SEPT. 9, 1907.

974,932.

Patented Nov. 8, 1910.

WITNESSES:
Géza Pernay
L. M. Miller

INVENTOR
Emil Traub,
BY
Henry J Miller
ATTORNEY

THE NORRIS PETERS CO., WASHINGTON, D. C.

UNITED STATES PATENT OFFICE.

EMIL TRAUB, OF NEWARK, NEW JERSEY, ASSIGNOR TO THE SINGER MANUFACTURING COMPANY, A CORPORATION OF NEW JERSEY.

FINISHING-TOOL.

974,932.  Specification of Letters Patent.  Patented Nov. 8, 1910.

Application filed September 9, 1907. Serial No. 391,922.

*To all whom it may concern:*

Be it known that I, EMIL TRAUB, a citizen of the United States, residing at Newark, in the county of Essex and State of New Jersey, have invented certain new and useful Improvements in Finishing-Tools, of which the following is a specification, reference being had therein to the accompanying drawings.

This invention has for its object to improve the construction and effectiveness of cutters for machine tools, and particularly that class of cutters employed for making a finishing cut upon cylindrical work, either internal or external.

In one form the invention is embodied in a tool-holder having an axial cutter cavity with flat transverse seat to which is applied the inner face of a disk cutter of less width or diameter formed with an annular series of integral symmetrically disposed inwardly extending cutting teeth adapted to serve as an external reamer or finishing cutter for truing the surface of the work to a given size. Where the work is formed in sections of different diameters, the holder may be provided with a spacing ring or bushing seated at one end upon said cutter and having at its opposite end a seat for a second cutter of similar form but larger diameter of cutting portion. The symmetrical arrangement of the cutting teeth produces a uniform cutting action upon different sides of the work tending to maintain the same concentric with its form previous to such final cut, and to prevent the springing of the work, while the reduced size of the cutting disk in relation to its seat in the cutter-holder permits of a slight lateral movement to enable the cutter to adjust itself readily to the work.

Heretofore in the finishing of external cylindrical surfaces to an exact size, it has been customary to employ a single cutting tool in a manner similar to the previously used roughing tool, but making a much finer cut so as to avoid springing the work more or less at different distances from the chuck or center supporting the work. By this means it has been impracticable to finish the work of uniform diameter, especially where the length greatly exceeded the diameter. By constructing the cutter-disk with a plurality of opposed teeth accurately spaced by the use of a reamer of the required size, and by loosely seating such a cutter-disk in its cavity in the cutter-holder, the operation of the tool is made uniform throughout the entire length of the work regardless of its length, and the quality of the work is greatly improved.

The invention will be more fully understood by reference to the accompanying drawings, in which—

Figure 3:
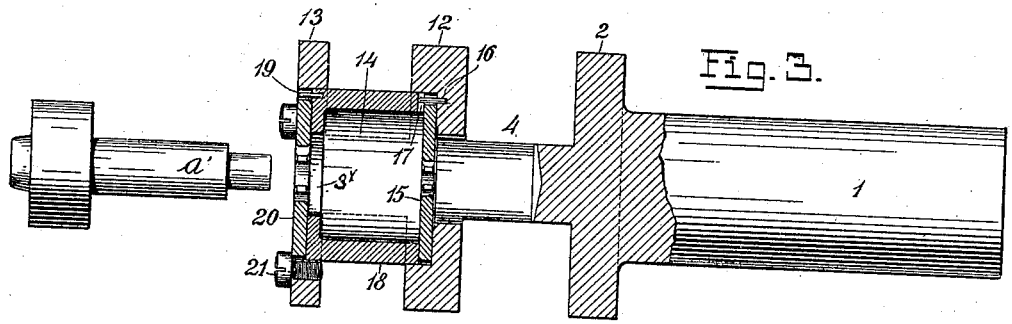
Figure 2:
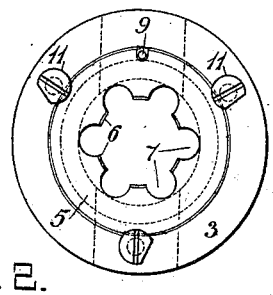
Figure 4:
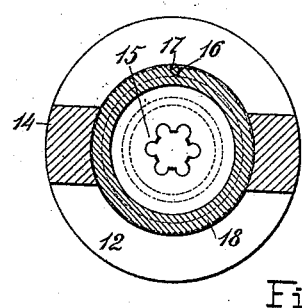
Figure 6:
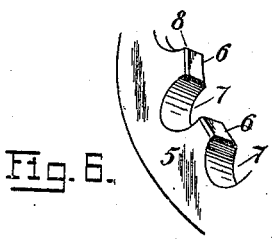
Figure 5:
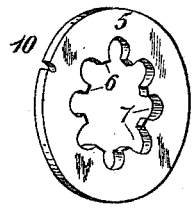

Figure 1 is a side elevation, partly in section, and Fig. 2 an end view of a cutter and holder therefor constructed in accordance with the present improvement. Fig. 3 is a sectional elevation representing the cutter and its holder in a modified form, and Fig. 4 a transverse section of the same intermediate the cutter-disks. Fig. 5 is a perspective view, upon a larger scale, of one of the cutters represented in Figs. 1 and 2, and Fig. 6 a similar view, upon a greatly enlarged scale, of a portion of such cutter.

The present improvement is designed especially for, although not limited to, application to screw machines in which the piece of work $a$ is secured in a rotating chuck and the cutting tools are carried by holders mounted radially in a turret receiving periodical rotary movements and mounted upon a reciprocating slide so as to present the respective tools successively to the work to perform the required roughing and finishing operations thereon.

As represented in Figs. 1 and 2, the cutter-holder 1 is formed with a head composed of inner and outer disks 2 and 3, respectively, joined together by longitudinal members 4 with intermediate spaces for delivering chips from the cutter-disk 5 which is seated upon the bottom of a circular cavity in the outer face of the disk 3. The outer disk 3 has also an axial clearance aperture $3^x$ extending entirely through the same adapted to admit the chips or cuttings from the cutter to the open space intermediate the disks 2 and 3 from which they are permitted to drop through the spaces between the diametrically arranged parallel connecting members 4. As herein represented, the cutter is constructed as a solid disk formed in a single piece having a circular periphery and flat faces, and is formed with a central opening having an annular series of integral symmetrically arranged inwardly extending cutter teeth 6 produced by the intermediate segmental recesses or notches 7 which form with the cylindrical inner faces of the teeth 6 the cutting edges operating upon the work. Each tooth has a slight bevel 8 at each of the opposite faces of the cutter-disk 5 to afford clearance in the operation of the tool.

The cutter cavity of the tool-holder disk 3 is provided at one edge with a holding pin 9 entering a notch 10 in the periphery of the cutter-disk 5 to hold the latter from rotation in relation to the cutter-holder while permitting it to shift laterally within the same to accommodate itself to the work. The disk 3 is also provided with a series of fastening screws 11 whose heads slightly overhang the cutter cavity and serve to lock the cutter disk therein.

In cases wherein the work requires finishing cuts of different diameters upon two or more sections in alinement, the tool-holder may be constructed with provision for carrying a plurality of cutters. As represented in Figs. 3 and 4, the shank 1 of the holder is provided with a disk 2, and in addition with the parallel transversely arranged disks 12 and 13 connected by means of the longitudinally disposed members 4 and 14 respectively. The disk 12 is provided, as is the disk 3, with a cutter cavity upon the bottom of which is seated the flat face of the cutter-disk 15 having a peripheral notch entered by the steady-pin 16 which passes through the same and enters a notch 17 in the hollow bushing 18 having its outer end fitted to the cylindrical aperture in the cutter-holding disk 13. The outer end of the bushing 18 is provided with a flat seat and with a steady-pin 19 entering a peripheral notch in the cutter-disk 20 seated thereon and held within the cutter cavity afforded by the holding disk 13 and the forward end of the bushing 18 by means of fastening screws 21, as previously described. The cutters 15 and 20 are similar to the cutter 5 excepting in the size of their central apertures which are formed, as before described, to accommodate sections of the work a' of different diameters, as illustrated in Fig. 3.

While the present improvement is designed more particularly for finishing tools such as external reamers, it is to be understood that under certain conditions it may be employed in connection with roughing tools, and the invention is not therefore limited to the particular class of work hereinbefore described.

Having thus set forth the nature of the invention what I claim herein is:—

1. The combination with a cutter-holder for machine tools constructed with a head composed of axially arranged inner and outer disks of which the latter is formed with a circular cutter-receiving cavity in its outer face and with a central clearance aperture extending through the same, said disks being connected together by parallel longitudinal members at opposite sides of their centers to afford intermediate spaces for release of chips or cuttings, of a solid cutter-disk of smaller diameter than said cavity and disposed therein, said cutter-disk being formed with a central aperture having a circular series of convergent cutter-teeth formed with straight substantially parallel cutting edges and with a peripheral notch or aperture, and a steady pin disposed within the cutter-receiving cavity and entering said notch or aperture within the cutter-disk.

2. A cutter for machine tools comprising a plurality of flat-faced cutter-disks each formed with an annular series of inwardly extending cutter-teeth, in combination with a holder therefor provided with a receiving cavity of larger area than said cutter-disks and having a seat at its inner end to receive one of said cutter-disks, a spacing ring or bushing inserted within said cavity and having seats at opposite ends one of which rests upon the first-named cutter-disk and the other of which receives another of said cutter-disks, means engaging the second-named cutter disk for confining both cutter-disks and the intermediate spacing ring or bushing within said cavity, and means for locking both cutter-disks from turning within said cavity.

In testimony whereof, I have signed my name to this specification, in the presence of two subscribing witnesses.

EMIL TRAUB.

Witnesses:
JOSEPH F. JAQUITH,
HENRY J. MILLER.